F. SPINELLI.
STATIC FREQUENCY CHANGER.
APPLICATION FILED MAR. 20, 1913.

1,157,730.

Patented Oct. 26, 1915.

Witnesses:
G. M. Hulet
E. B. Anderson

Inventor:
Francesco Spinelli
per A. M. Glass
Attorney.

UNITED STATES PATENT OFFICE.

FRANCESCO SPINELLI, OF MILAN, ITALY.

STATIC FREQUENCY-CHANGER.

1,157,730.  Specification of Letters Patent.  Patented Oct. 26, 1915.

Application filed March 20, 1913. Serial No. 755,779.

*To all whom it may concern:*

Be it known that I, FRANCESCO SPINELLI, a subject of the King of Italy, residing at Milan, Italy, have invented a certain new and useful Improvement in Static Frequency-Changers, of which the following is a specification.

The present invention relates to an arrangement for the static transformation of three-phase alternating current into mono-phase alternating current having the treble frequency of the primary current, and has mainly for its object to furnish by means of a static apparatus the power for lighting in all cases where only low frequency current is available. This applies to all small railway stations, signal boxes and the carriages of electric railway lines in which a frequency of fifteen periods is used.

The invention is illustrated by way of example in the accompanying drawings in which—

Figure 1:
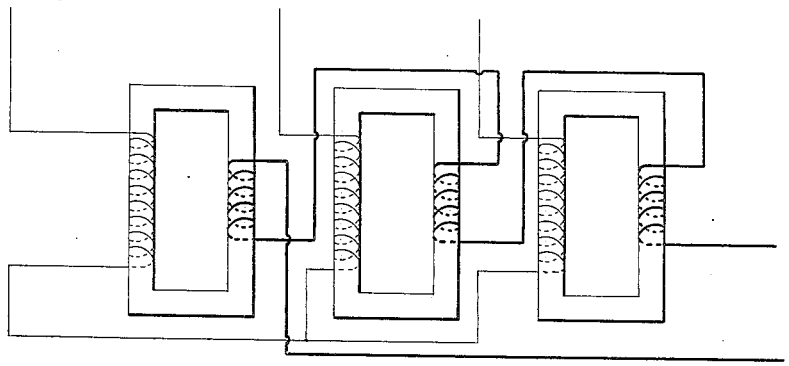
Figure 2:
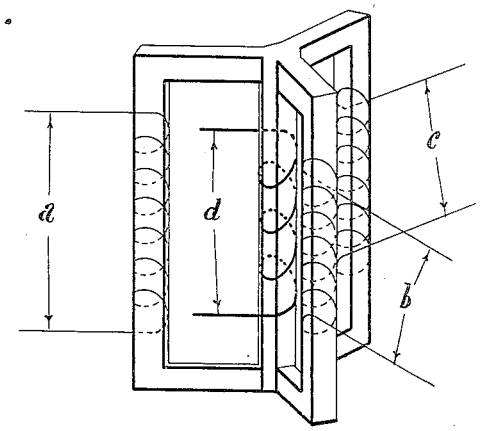
Figure 3:
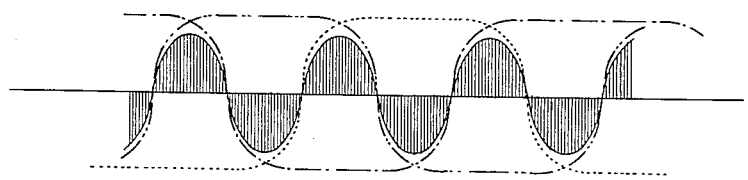

Figure 1 represents an embodiment of the apparatus in which three mono-phase transformers are employed. Fig. 2 represents an embodiment comprising a single transformer having a plurality of cores. Fig. 3 is a diagram illustrating the principle on which the invention is based.

According to Fig. 1, the secondary windings of three mono-phase transformers are connected in series and each of these windings is supplied through its primary winding with one phase of a three-phase system. The transformers should have very high density of magnetic flux so as to be highly saturated. The primaries of these transformers may be connected either according to the star or to the triangle method.

In the arrangement shown in Fig. 2, a single transformer is used having four cores of which three, $a$, $b$, $c$, serve for the three phases of the primary three-phase current, while the fourth core $d$ serves for the secondary mono-phase current having the treble frequency.

As may be seen from Fig. 3, the principle on which the invention is based is the following: The sum of three alternating fluxes which are shifted in phase by 120 degrees and act upon a magnetic circuit which is highly saturated, produce a mono-phase flux of the treble frequency.

It will thus be appreciated that the transformer is broadly constituted by three ordinary mono-phase transformers, the primaries of which are connected starwise with a three-phase system of low frequency, while the secondaries are connected in series. If the windings are calculated in such a manner that the iron acts within approximately constant limits of permeability, the ends of the secondary circuit (that is to say the two ends of the series) will not give any voltage in view of the known property of three-phase systems that the algebraic sum of the vectors of the three phase is at all times equal to zero. If, however, the iron be highly saturated, in which case the permeability becomes very small, the alternative curve of the field ceases to present the sinusoidal form and assumes approximately the form of trapeziums of much smaller amplitude than the corresponding sinusoid. If three curves of this character be drawn which are displaced by 120° it will readily be seen that the algebraic sum of the three fundamental curves can be described by points. The result is an alternative curve presenting a frequency three times as great as the fundamental curve.

Although it is a question of a phenomenon of a differential nature and which calls for a powerful magnetization current, it has been found possible to construct a model giving an efficiency of 63% at full charge. This efficiency may be regarded as highly satisfactory in view of the very low cost of the energy in electric railways and taking into account the enormous advantage realized by replacing rotary converters and portable batteries by a single static apparatus requiring no superintendence or upkeep.

The transformer described has been constructed for 750 watts with the ratio of 160/40 volts. Its weight is approximately 35 kilograms.

I claim as my invention:

In a system for the static transformation of the three-phase alternating current into a mono-phase alternating current of the treble frequency, comprising a three-phase system, three mono-phase transformers having highly saturated cores, and primary and secondary circuits, said secondary circuits being connected in series and said primary circuits being supplied by the three respective phases of the three-phase system, substantially as described.

In testimony whereof I have affixed my signature in presence of two witnesses.

FRANCESCO SPINELLI.

Witnesses:
M. ALBERT PERIS,
GIUSEPPI GRIFFE.